(12) United States Patent
Gaastra (10) Patent No.: US 6,695,335 B1
(45) Date of Patent: Feb. 24, 2004

(54) CYCLE, IN PARTICULAR A BICYCLE

(76) Inventor: Andries Gaastra, Listdreef 24, B-2900, Schoten (BE)

( * ) Notice: Subject to any disclaimer, the term of this patent is extended or adjusted under 35 U.S.C. 154(b) by 0 days.

(21) Appl. No.: 09/743,819

(22) PCT Filed: Jul. 13, 1999

(86) PCT No.: PCT/IB99/01429

§ 371 (c)(1),
(2), (4) Date: Feb. 15, 2001

(87) PCT Pub. No.: WO00/03913

PCT Pub. Date: Jan. 27, 2000

(30) Foreign Application Priority Data

| Jul. 16, 1998 | (NL) | 1009665 |
| Feb. 25, 1999 | (NL) | 1011385 |

(51) Int. Cl.$^7$ ............................................. B62K 19/36
(52) U.S. Cl. ............... 280/288.1; 280/220; 297/215.11; 297/215.13; 297/215.14
(58) Field of Search ................. 297/195.1, 215.11, 297/215.12, 215.13, 215.14; 280/288.1, 220, 293, 294, 295, 296, 297, 298, 299, 300, 301, 302, 303, 304, 304.3, 284, 285, 270, 274, 240, 281.1; D12/186; 74/496, 551.5, 551.6

(56) References Cited

U.S. PATENT DOCUMENTS

| 2,147,732 | A | * | 2/1939 | Boynton | 280/261 |
| D158,652 | S | * | 5/1950 | Dailey | D12/186 |
| 2,510,222 | A | * | 6/1950 | Harley | 250/152.1 |
| D164,074 | S | * | 7/1951 | Tiley | D12/111 |
| 3,858,906 | A | * | 1/1975 | Wright | 280/283 |
| 3,866,908 | A | * | 2/1975 | Hangler | 211/22 |
| 4,223,906 | A | * | 9/1980 | Gratza | 280/301 |
| 4,363,516 | A | * | 12/1982 | Braley et al. | 297/215.1 |
| 4,417,746 | A | * | 11/1983 | Baron | 280/301 |
| 4,475,770 | A | * | 10/1984 | Persons, II | 297/353 |
| 4,541,500 | A | * | 9/1985 | Gelhard | 180/205 |
| 4,653,766 | A | * | 3/1987 | Guandalini | 280/226.1 |
| 4,733,880 | A | * | 3/1988 | Wilhelm, III | 280/234 |
| 4,789,174 | A | | 12/1988 | Lawwill | 280/284 |
| 4,842,292 | A | * | 6/1989 | Wang | 280/287 |
| 5,351,979 | A | * | 10/1994 | Langen | 280/254 |
| 5,507,200 | A | * | 4/1996 | Reed et al. | 280/291 |
| 5,509,678 | A | | 4/1996 | Ullman et al. | 280/281.1 |
| 5,520,266 | A | * | 5/1996 | Maras | 188/24.11 |
| 5,620,196 | A | * | 4/1997 | Belik | 248/903 |
| 5,853,062 | A | * | 12/1998 | Hulett | 180/206 |
| 6,170,846 | B1 | * | 1/2001 | Holter | 280/293 |
| 6,189,908 | B1 | * | 2/2001 | Lu | 280/284 |
| 6,199,888 | B1 | * | 3/2001 | Ito | 280/303 |
| 6,203,043 | B1 | * | 3/2001 | Lehman | 280/124.136 |
| 6,378,882 | B1 | * | 4/2002 | Devine | 280/234 |
| 6,554,307 | B1 | * | 4/2003 | Ockenden | 280/204 |

FOREIGN PATENT DOCUMENTS

| CA | 2104836 | | 2/1995 | | |
| DE | 29613317 | U1 * | 5/1997 | | A63H/17/18 |
| DE | 29719662 | | 4/1998 | | |
| JP | 05085459 | A * | 4/1993 | | B62K/21/00 |
| NL | WO 99/25604 | | * 5/1999 | | B62K/21/16 |

* cited by examiner

Primary Examiner—Lesley D. Morris
Assistant Examiner—Daniel Yeagley
(74) Attorney, Agent, or Firm—Milde & Hoffberg, LLP (57) ABSTRACT

A cycle on which the user can assume a comfortable upright position, that has a frame with a mainly vertically directed seat tube and a handlebar with a steering tube that is directly fastened to a front fork. In front of the seat tube there is a seat that can be slid along the seat tube to adjust the height. This construction, with a cycle with an upright position of the user, allows a broad range of adjustment of the seat, making the cycle suitable for users of any size. The upright position of the user can be improved even more by placing the bottom bracket axle of the cycle lower than 10 cm above an imaginary line through the wheel axles of the front and rear wheel, preferably even under this line.

17 Claims, 5 Drawing Sheets

CYCLE, IN PARTICULAR A BICYCLE

BACKGROUND OF THE INVENTION

1. Field of the Invention

The invention relates to a cycle, in particular a bicycle, comprising a frame with a seat tube, a height-adjustable seat that is connected to the seat tube, which seat tube comprises a portion that is at an angle from 0 to 45° to the vertical direction, with the seat being conneted to said portion and being located in front of the seat tube, a rear wheel that is connected to the frame, a front fork in which a front wheel is present and that has a pivoting connection with the frame, a handlebar with a steering tube with one end fastened to the front fork, and handgrips that are part of the handlebar and are fastened to the steering tube. Due to the presence of a handlebar that is directly connected to the front fork it is possible to manufacture the cycle in such a way that a user of the cycle can assume a comfortable upright position on the cycle. The term "cycle" here should be understood to mean a bicycle, a tricycle, or a cycle with more wheels than three, both with and without a motor.

2. Prior Art

Such a cycle is known from CA-A-2104836. The known cycle allows the user to assume a comfortable upright position on the cycle due to the presence of a handlebar that is directly connected to the front fork. For the height adjustment of the seat the known cycle has a frame with a bar with a portion that slopes upward in which a tube can be slid. On front of the tube that extends out of the bar a seat with a back support is fastened. On behalf of the required strength of the connection between the tube and the bar the tube should always be slid at least to a certain extend into the bar. This limits the adjustment range of the seat. If one then also wishes to facilitate a relatively low position of the seat, the consequence is that the slanted portion must be relatively short, so that the adjustment range is even more limited.

SUMMARY OF THE INVENTION

An objective of the invention is to produce a cycle of the type described in the preamble in which the construction of the cycle realises a better height adjustment of the seat than is the case with the known cycle. To this end the cycle according to the invention is characterised by the fact that the seat can be slid along the seat tube. By connecting the seat in front of the seat tube with the seat tube itself, less limitations result in terms of the length or height of the mainly vertically directed portion of the seat tube than in the known cycle, allowing a greater adjustment range of the seat than is the case with the known cycle.

Though it is indeed true that in DE 195 11 629 A1 en DE 44 03 706 C1 bicycles are known that have a mainly vertical seat tube and a seat that is in front of the seat tube, these known bicycles are so-called recumbent bicycles in which the user assumes more of a recumbent position than a sitting position and in which no handlebar is fastened to the front fork but, instead, steering takes place with the help of handles that are present near the seat. Such recumbent bicycles have a low sitting/recumbent position and are suitable for more physically active people. These recumbent bicycles do not offer the convenience and comfort of bicycles with a conventional handlebar in which the user assumes a sitting position.

In addition, from DE 297 19 662 U1 and U.S. Pat. No. 5,509,678 bicycles are known that are provided with a conventional handlebar with the seat being slidable along a tube of the frame. However, the frames of these known bicycles do not have a mainly vertically directed seat tube, and in these bicycles the seat is not in front of the seat tube but above a virtually horizontal tube of the frame. In these known bicycles, too, the user assumes more of a recumbent position than a sitting position.

An embodiment of the cycle according to the invention is characterised by the fact that the cycle comprises a bottom bracket axle that is connected to the frame at a position that, during use of the cycle, is lower than an imaginary line which extends parallel to and is 10 cm above an imaginary line through the wheel axles of the front and rear wheel. This makes it possible for the user to assume an even more comfortable upright position on the bicycle. In addition, a low bottom bracket axle permits a construction of the cycle in which a low mounting height is possible. The minimal mounting height is determined by the height of the bottom bracket axle.

Preferably the position of the bottom bracket axle is lower than the imaginary line through the wheel axles of the front and rear wheel.

Preferably the cycle also has a back support that is connected to the seat and comprises two parts which can be adjusted in relation to each other. The back support can be solidly fastened, for example by means of a connection element, to the seat or the back support can be adjustable in relation to the seat. The two parts of the back support are located preferably on top of each other with the upper part being adjustable in terms of height in relation to the lower part.

An embodiment of the cycle with a favourable fastening construction of the seat and/or the back support to the frame is characterised by the fact that the seat and/or back support is/are connected to a profile that can be slid along the seat tube and can be. fastened to the seat tube. The profile being able to slide and be fastened can be favourably realised by a construction in which there is a bracket on either side of the seat tube that extends lengthwise in relation to the seat tube, with the profile between the brackets and the seat tube being able to be slid, with the brackets clamping the profile securely against the seat tube.

To obtain increased comfort in a cycle the wheels can be fastened to the frame with springs. From the American patent specification number U.S. Pat. No. 4,789,174 a rear wheel suspension assembly of a bicycle is known in which the bicycle has a bottom bracket axle that is connected to the frame, and the axle of the rear wheel is coupled with a wheel bearer that has a bottom and top end, with a first wheel guide arm being connected to the bottom end in a pivoting manner, which first wheel guide arm is connected with its other end in a pivoting manner to the frame at a point that is a short distance from the bottom bracket axle of the bicycle, and in which on the top end of the wheel bearer a second wheel guide arm with an end is connected in a pivoting manner, which second wheel guide arm is connected with its other end in a pivoting manner to the frame. A disadvantage of this wheel suspension is that, because the center of rotation of the first wheel guide arm in relation to the frame is a distance away from the chain wheel on the bottom bracket axle, when the chain moves it moves a considerable distance such that it becomes difficult to utilise a chain guard.

An embodiment that does not have this disadvantage is characterised by the fact that the first wheel guide arm is connected with its other end to the frame such that it can pivot around an imaginary axis through the bottom bracket axle of the cycle. Thus the chain moves a smaller distance when it operates, so that a chain guard can be used more easily.

It should be remarked that this embodiment can also be used independently of the above described construction of the seat on the frame, on any cycle at all, thus keeping the option open of splitting this advantageous construction from the patent application at hand and claiming it independently.

In known cycles on each side of the frame there is a rear wheel suspension assembly, so that each of the wheel bearers have a notch for picking up the axle of the rear wheel, which notch comprises a mainly vertically running slot that is open at the bottom. In these open slots on the bottom the rear wheel and its axle can be slid and then fixed in place on the wheel bearers. To improve the adjustment options of the rear wheel in such a construction an embodiment is characterised by the fact that at least one of the notches is provided with a mainly horizontally running further slot that connects to the top end of the vertical slot.

It should be remarked that this embodiment, too, can be used independently of the above mentioned constructions, on any cycle at all, and that for this reason the option is kept open of splitting this advantageous construction from the patent application at hand and claiming it independently.

Cycles are known in which the handlebar comprises two mainly parallel steering tubes, each with a free end that has a handgrip. To be able to adjust the position of these handgrips these steering tubes can be made so that they can pivot. In the adjustment of the position of the handgrips it is desirable that the handgrips be placed mirror symmetrically in relation to each other. An embodiment in which the adjustment of the steering tubes and thus the handgrips is better possible is characterised by the fact that the steering tubes are coupled with each other by a synchronisation mechanism that converts an angular rotation of one of the steering tubes into an equal sized but opposite angular rotation of the other steering tube.

Here once again it should be remarked that this embodiment, too, can be used independently of the above mentioned constructions, on any cycle at all, and that for this reason the option is kept open of splitting this advantageous construction from the patent application at hand and claiming it independently.

A favourable embodiment of the synchronisation mechanism is characterised by the fact that the synchronisation mechanism comprises at least one coupling element that is connected with both steering tubes, with the connection with one of the steering tubes, in terms of the lengthwise direction of the cycle, being present on the front of that steering tube, with the connection with the other steering tube being on the back side of that steering tube. To be able to transfer the angular rotation of the one steering tube to the other steering tube the connection between the steering tubes must not be stiff. For this purpose the coupling element can be connected to the steering tubes in a pivoting manner or the coupling element can be flexible, for example in the form of a cable.

Another embodiment that requires little space and is uncomplicated is characterised by the fact that the synchronisation mechanism comprises two coupling elements which are each separately or else jointly formed by a cable and which cross each other between the steering tubes. This embodiment is particularly desirable if the coupling elements are executed as cables. Since cables can only transmit drawing force, to facilitate angular rotation in two directions it is necessary to use two cables. The two coupling elements can be made of one cable here, with the cable then being of an 8-shape.

Another embodiment of the cycle according to the invention is characterised by the fact that the cycle comprises a mudguard that is formed by an extrusion profile that has on its sides notches over the entire length for containing dress guards and/or electrical cables. This makes it possible to better fasten or guide dress guards and/or electrical cables to the cycle.

Here it should also be remarked that this embodiment, too, can be used independently of the above mentioned constructions, on any cycle at all, and that for this reason the possibility is retained of splitting this advantageous construction from the patent application at hand and claiming it independently.

Another embodiment is characterised by the fact that the cycle has a steering head comprising a housing fastened to the frame and an axle that pivots in the housing that is fastened to a front fork of the cycle, such that the handlebar with the front fork and the front wheel of the cycle can be turned, with the axle being at an angle in relation to the front fork in such a way that the intersection of an imaginary line through the axle and the ground is closer to the contact surface of the front wheel with the ground than the intersection of an imaginary line through the front fork with the ground. This increases the stability of the cycle in comparison with a cycle in which the axle runs parallel with the front fork. This favourable effect is greater the more the front fork is placed flat.

In addition, it should be remarked that this embodiment can be used independently of the above mentioned constructions, on any cycle at all, and that for this reason the possibility is retained of splitting this advantageous construction from the patent application at hand and claiming it independently.

Another embodiment is characterised by the fact that the cycle comprises a kickstand that can pivot between a folded-in position and a folded-out position and that the cycle has a locking mechanism for locking the kickstand in the folded-out position, which locking mechanism is housed in a tube of the frame.

A favourable embodiment of this is characterised by the fact that the locking mechanism comprises a revolving cam that can pivot between a release position and a lock position, in which latter position the cam encloses a pin present on the kickstand, so that using a lock either on the cycle or externally the cam can be locked in place.

Another favourable embodiment of this is characterised by the fact that the cam pivots around an axle that is secured by a pin that is fixed in place with a bolt, which bolt is located between parts of the cycle such that the bolt is only accessible to be removed after the cycle has been dismantled.

Once again it should be remarked that the embodiments, too, of the kickstand with locking mechanism can be used independently of the constructions discussed above, on any cycle at all, and that for this reason the possibility is kept open of splitting these advantageous constructions from the patent application at hand and claiming them independently.

BRIEF DESCRIPTION OF THE DRAWINGS

The invention will be elucidated more fully below by means of drawings in which an embodiment of the cycle according to the invention is shown. In these drawings.

DETAILED DESCRIPTION OF THE DRAWINGS

Figure 1:
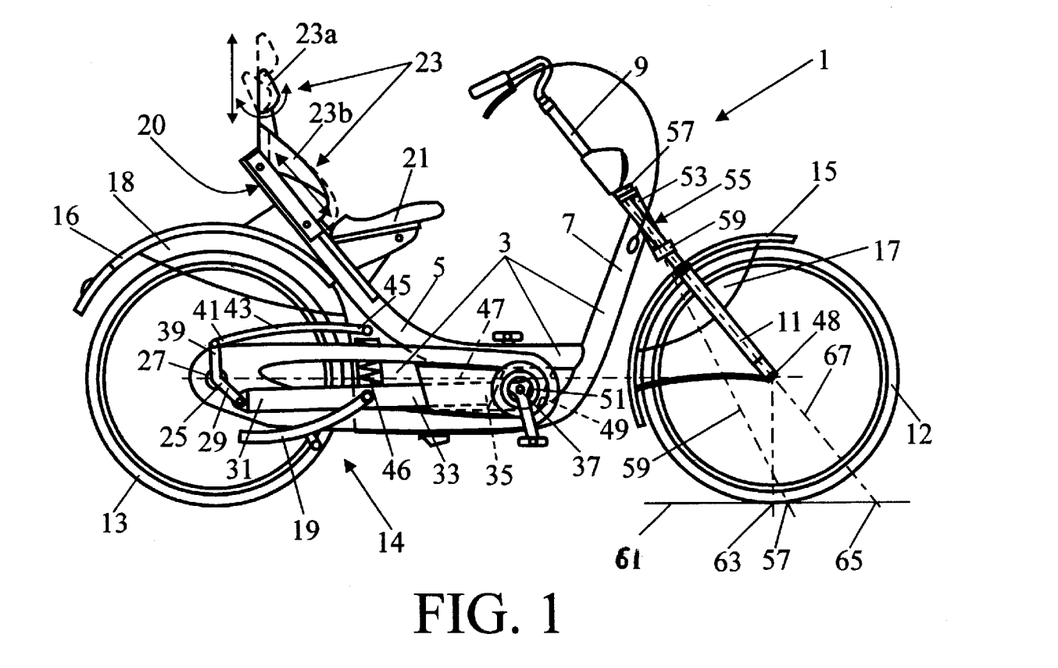
FIG. 1 is a side view of the cycle according to the invention.

In FIG. 1 a side view of an embodiment of the cycle according to the invention is shown, in the form of a bicycle. The bicycle 1 has a frame 3 with a seat tube 5 and a frame tube 7 that are fastened to each other. On the frame tube 7 there is handlebar 9 and a turnable front fork 11. The handlebar has two steering tubes whose ends are directly fastened to the front fork 11 (see also FIG. 6). Two handgrips are fastened to the steering tubes. The front fork 11 is connected in a springed manner to the frame 3. In the front fork 11 is a front wheel 12. In addition, a rear wheel 13 is connected by means of a rear wheel suspension assembly 14 to the frame 3. The front wheel 12 and the rear wheel 13 are partially protected by mudguards 15 and 16 and dress guards 17 and 18 fastened to these. The cycle 1 is also provided with a kickstand 19 with which the cycle can stand up independently. This kickstand 19 is lockable, which is illustrated further on by way of FIGS. 9 through 11. The seat tube 5 has a mainly vertically directed portion 20 along which a seat 21 and a back support 23 can be slid, such that the seat and the back support are adjustable in terms of height. The seat 21 and the back support 23 are connected to each other with a bar and are adjustable in relation to each other. The back support 23 has two parts, 23a and 23b, one above the other that are adjustable in relation to each other.

The rear wheel suspension assembly 14 has a wheel bearer 25 that is fastened to the wheel axle 27 of the rear wheel. The bottom end 29 of the wheel bearer 25 is connected in a pivoting manner to an end 31 of a first wheel guide arm 33. The other end 35 of the first wheel guide arm 33 is on bearings in the housing of the bottom bracket axle 37 of the bicycle and can thus pivot around an imaginary line through the bottom bracket axle. The top end 39 of the wheel bearer 25 is connected in a pivoting manner to an end 41 of a second wheel guide arm 43. The other end 45 of the second wheel guide arm 43 is connected in a pivoting manner to the frame 3. On the frame 3 also a compression spring 46 is fastened by its end, which compression spring 46 is fastened by its other end to the first wheel guide arm 33. The bottom bracket axle 37 is lower than an imaginary line 47 through the wheel axle 27 of the rear wheel and the wheel axle 48 of the front wheel 12 to make a low mounting height possible. On the other side of the frame 3 there is a similar rear wheel suspension assembly. Both first wheel guide arms are connected to each other at several points by means of transverse connections.

Between the seat tube 5 and the frame tube 7 there is a parallelogram shaped bottom bracket axle housing bearer 49, in which a bottom bracket axle housing 51 is fastened and that is sturdily fastened to the tubes 5, 7. Because of this bottom bracket axle housing bearer 49 the rigidity of the frame 3 is increased such that the frame 3 is more stable. This also makes the bottom bracket axle housing 51 stiffer so it can be less easily damaged.

At the front end of the frame tube 7 is a housing 53 of a steering head 55. In the housing 53 there is a pivoting axle (not visible in the figure) that is fastened by means of two bridges 57 and 59 to the front fork 11 of the cycle 1. The axle of the steering head 55 is at an angle in relation to the front fork 11 such that the intersection 57 of an imaginary line 59 through the axle and the ground 61 is closer to the contact surface 63 of the front wheel 12 with the ground 61 than the intersection 65 of an imaginary line 67 through the front fork 11 with the ground 61. This increases the stability of the cycle 1.

According to the invention, the bottom bracket axel 37 must be lower than a line 47a which is parallel to, and 10 cm above the line 47.

Figure 2:
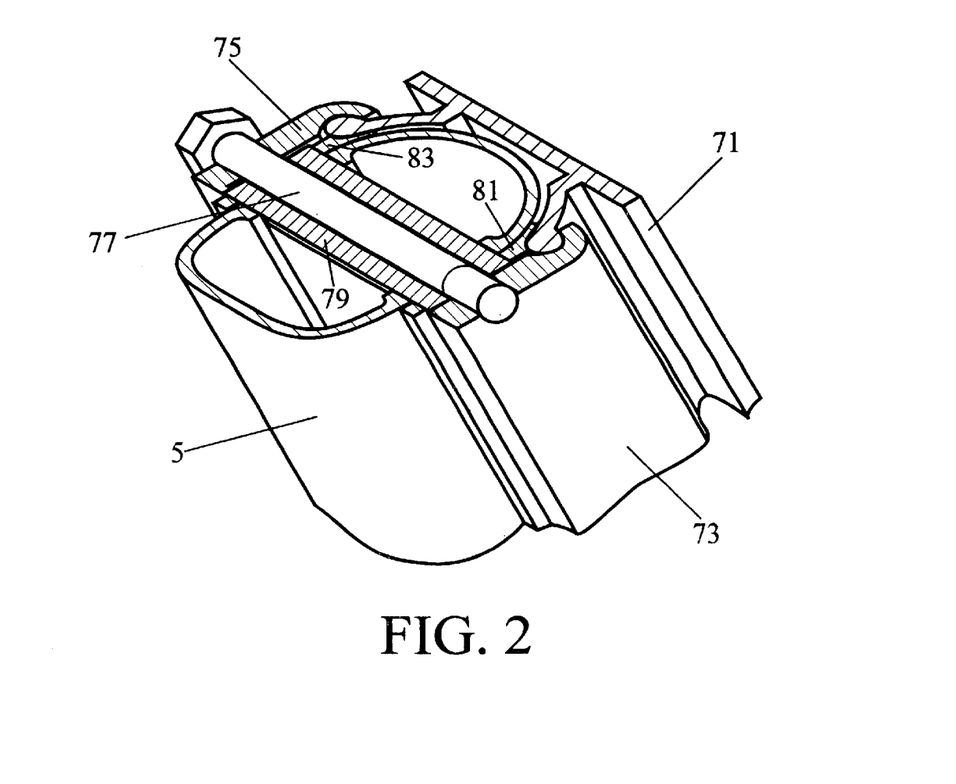
FIG. 2 is a exploded perspective view of the fastening construction of the seat and the back support to the seat tube of the frame.

In FIG. 2 the fastening construction of the seat and the back support to the seat tube 5 is shown in detail. A profile 71 is fastened to the seat and the back support that is present for a part of the length between the seat tube 5 and two brackets 73 and 75. The brackets 73, 75 are connected to each other at two places by means of a bolt 77 that goes straight through the seat tube 5 and extends through a bush 79. With the bolts 77 the brackets 73 and 75 can be clamped against the profile 71. Between the brackets 73, 75 and the profile 71 on the one hand and the seat tube 5 on the other, there are plastic strips 81 en 83. By unscrewing the bolts 77 the profile 71 can be slid along the seat tube 5 between the brackets 73, 75 and the plastic strips 81, 83.

Figure 3:
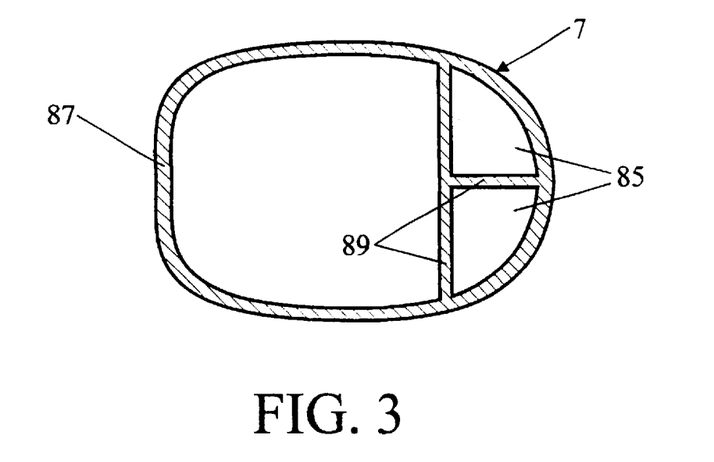
FIG. 3 is a cross section of the frame tube.

FIG. 3 shows a cross section of the frame tube 7. The frame tube 7 is formed by an extrusion profile and is provided with a number of ducts 85 running lengthwise through which cables of the brakes and the lighting can run. The ducts 85 are formed by the outer walls 87 and inner walls 89 of the extrusion profile.

Figure 4:
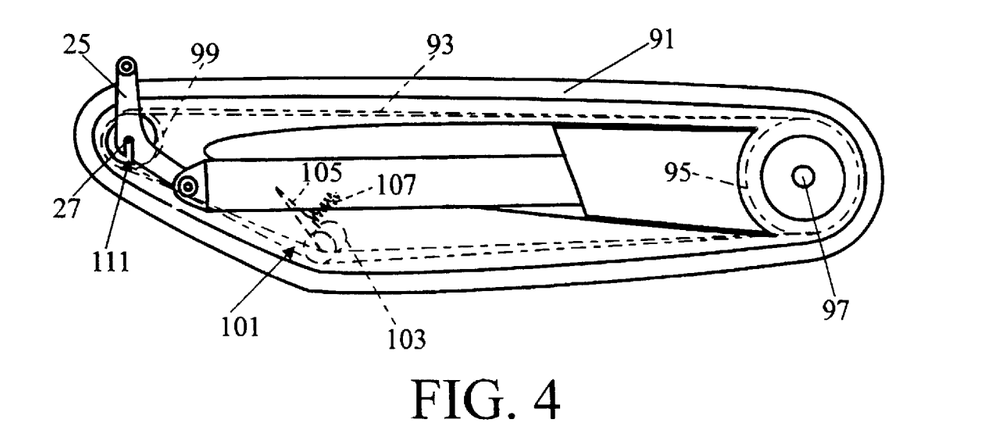
FIG. 4 is a side view of the chain guard and the rear wheel suspension.
Figure 5:
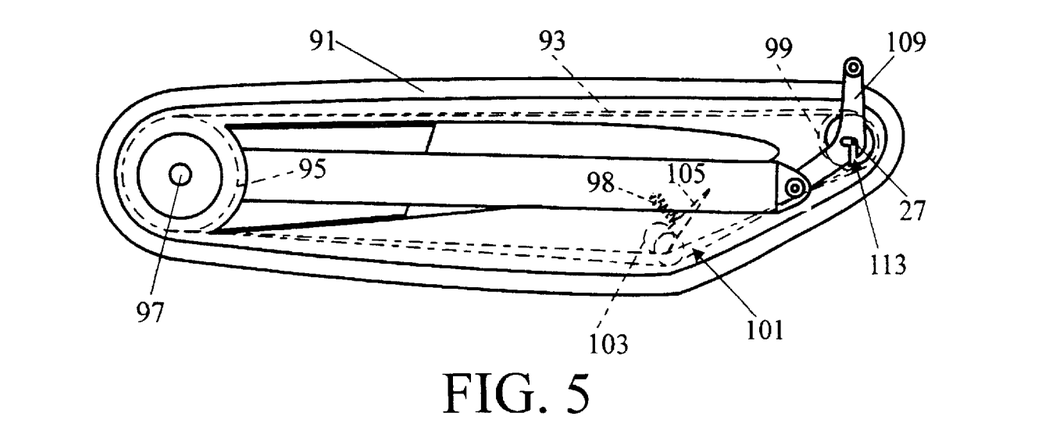
FIG. 5 is a view of the other side of the chain guard and the rear wheel suspension.

In FIGS. 4 and 5 the chain guard and part of the rear wheel suspension assembly are shown in two side views. The chain guard 91 contains a chain 93 that goes around a front chain wheel 95 on the bottom bracket axle 97 and a rear chain wheel 99 on the axle 27 of the rear wheel. In the chain guard 91 is a chain tensioner 101 that keeps the chain under tension. The chain tensioner has a small wheel 103 that is pivotally mounted on a hinged bar 105. Between the bar 105 and the chain guard there is a compression spring 107 that presses the wheel 103 against the chain 93. With broken lines, as shown, two different positions are indicated in which the various elements can be located.

For picking up the axle 27 of the rear wheel each of the wheel bearers 25 and 109 have a notch 111, 113. Each of these notches has a vertically transecting slot that is open at the bottom end. The notch 113 also has a horizontal running further slot that connects to the top end of the vertical slot, making it easier to adjust the rear wheel.

Figure 6:
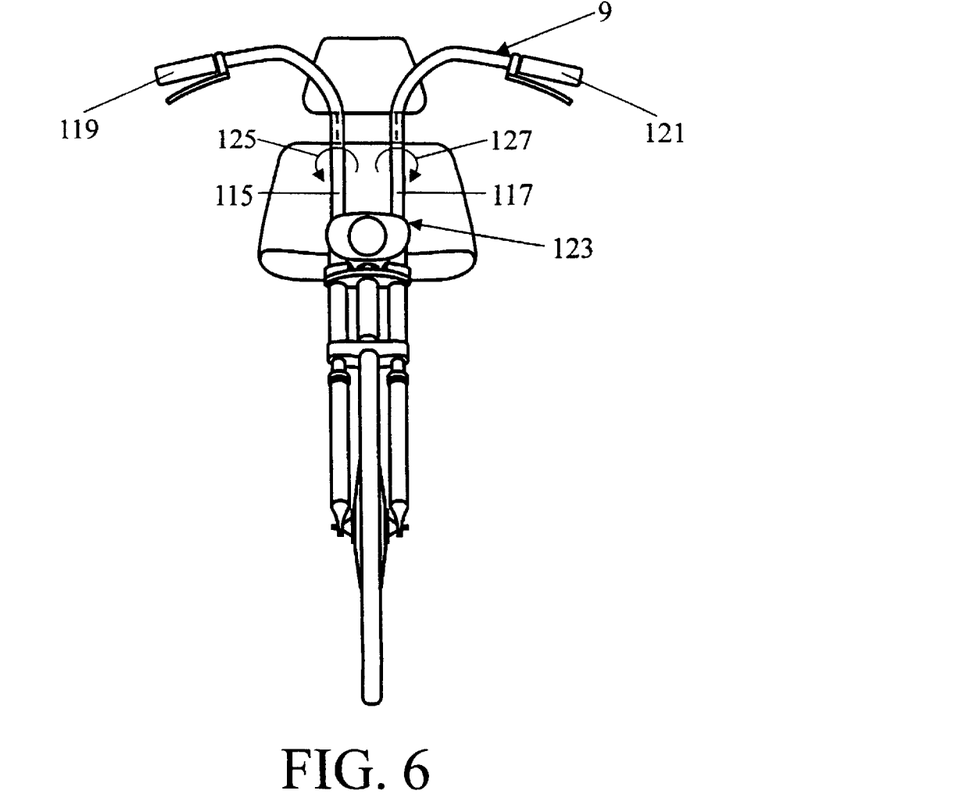
FIG. 6 is a perspective view of the handlebar assembly.

In FIG. 6 the handlebar assembly is shown in a perspective view. On the free ends of the steering tubes 115 and 117 of the handlebar 9 are the handgrips 119 and 121. The steering tubes 115, 117 are coupled with each other by means of a synchronisation mechanism 123. The synchronisation mechanism 123 converts an angular rotation 125 of one of the steering tubes into an equal sized but opposite angular rotation 127 of the other steering tube.

Figure 7:
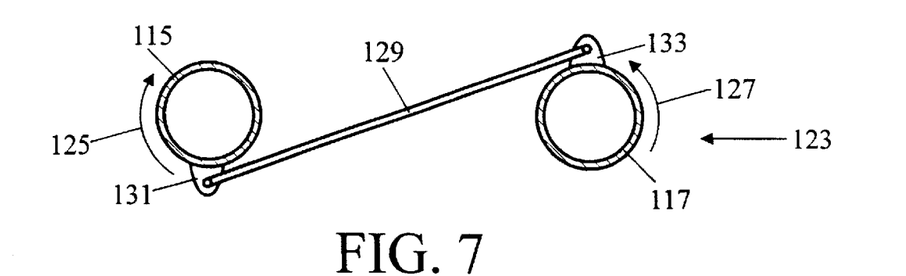
FIG. 7 is a first embodiment of the synchronisation mechanism.

In FIG. 7 a first embodiment of the synchronisation mechanism is shown. The synchronisation mechanism 123 has a coupling element 129, in the form of a rod, with each of its ends being pivotally fastened to a lip 131, 133 on one of the steering tubes 115, 117. Here the connection with the steering tube 115, in terms of the lengthwise direction of the cycle, is present on the front of the steering tube, and the connection with the other steering tube 117 is present on the rear of the steering tube. Through this construction an angular rotation 125 of the steering tube 115 is converted into an equal sized but opposite angular rotation 127 of the other steering tube 117.

Figure 8:
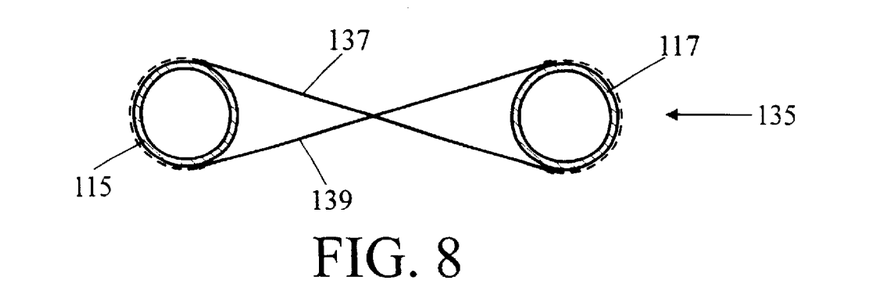
FIG. 8 is a second embodiment of the synchronisation mechanism.

In FIG. 8 a second embodiment of the synchronisation mechanism is shown. The synchronisation mechanism 135 has two coupling elements that are formed by cables 137 and 139 that cross each other between the steering tubes 115 and 117. Each cable 137, 139 is fastened by an end to the front side of one of the steering tubes and with the other end to the rear side of the other steering tube. Instead of two cables one cable can also be used that is then wrapped around the steering tubes (shown with broken line).

Figure 9:
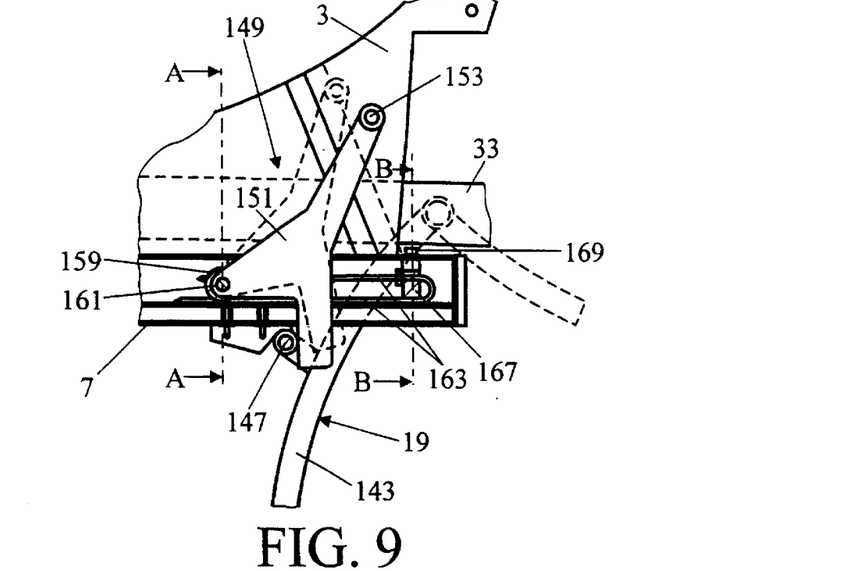
FIG. 9 is a detail of a kickstand and a locking system located in the frame.
Figure 10:
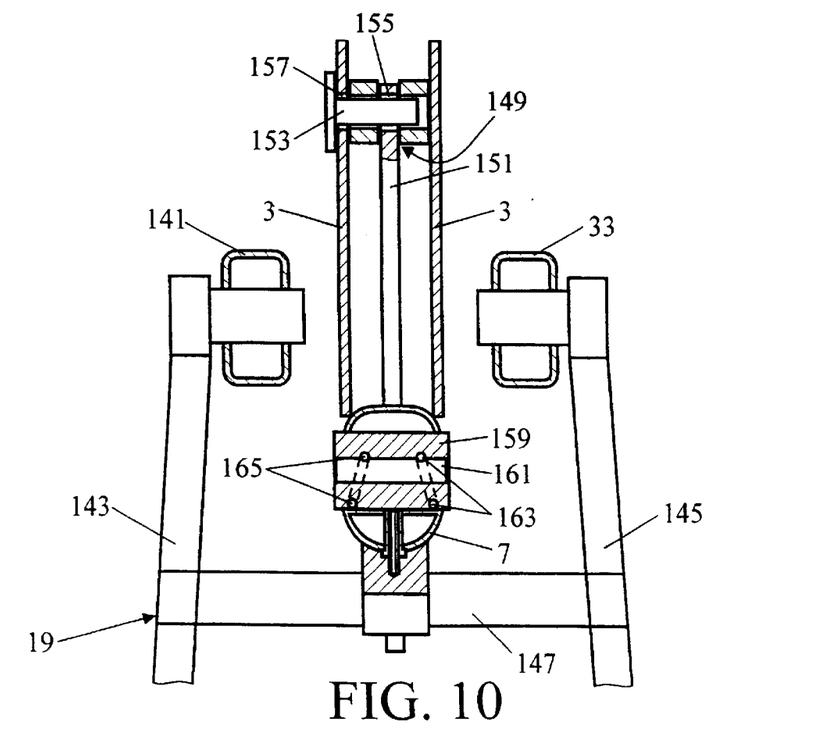
FIG. 10 is a cross section along line A—A in FIG. 9.
Figure 11:
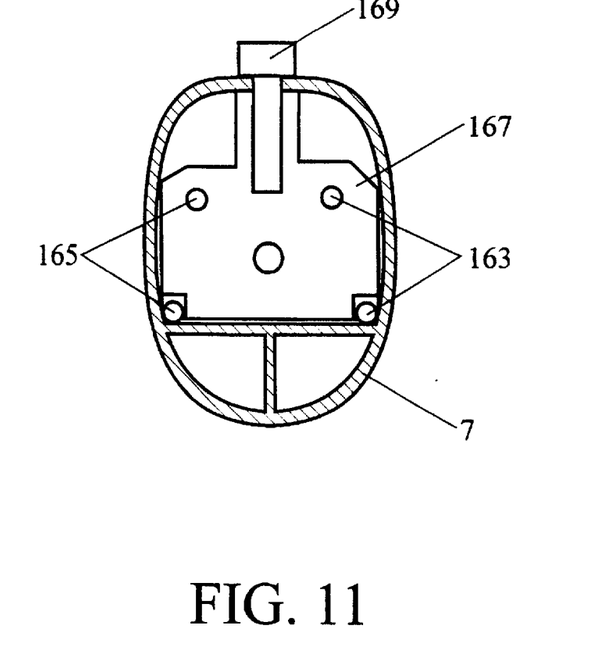
FIG. 11 is a cross section along line B—B in FIG. 9.

In FIGS. 9, 10 and 11 the kickstand of the cycle with a locking mechanism is shown in detail. Here FIG. 9 shows a detail of a longitudinal section of the cycle at the location of the kickstand and the FIGS. 10 and 11 show cross sections along respectively line A—A and line B—B in FIG. 9.

The kickstand 19 is fastened in a pivoting manner onto the wheel guide arms 33 and 141 and can pivot between a folded-in position (shown with broken line) and a folded-out position (shown with continuous line). The kickstand 19 has two legs 143 and 145 that are connected to each other with a pin 147. The pin 147 can be blocked in the folded-out position of the kickstand 19 by a locking mechanism 149. This locking mechanism 149 has a cam 151 that can pivot between a release position (shown with broken lines) and a lock position (shown with continuous lines). In the lock position the cam 151 locks the pin 147 of the kickstand 19. The cam 151 can be fastened in place by means of a lock 153 through an opening 155 in de cam 151 and an opening 157 in the frame 3. The cam 151 pivots around an axle 161 present in a bush 159. The bush 159 and the axle 161 are locked by two pins 163 and 165 so that the bush and the axle cannot be knocked out of the frame tube 7. The upper arms of the pins 163 and 165 lock the axle 161 in relation to the bush 159, while the lower arms of the pins lock the bush 159 in relation to the frame tube 7. The pins 163 and 165 are fastened by means of an auxiliary piece 167 with a bolt 169 in the frame tube 7. This bolt 169 is enclosed between parts of the cycle (the frame tube 7 and the compression spring 47) such that the bolt 169 is only accessible to be removed after the cycle has been dismantled. The bolt 169 can be such that special tools are required to loosen it, or that only destructive removal of it is possible.

Figure 12:
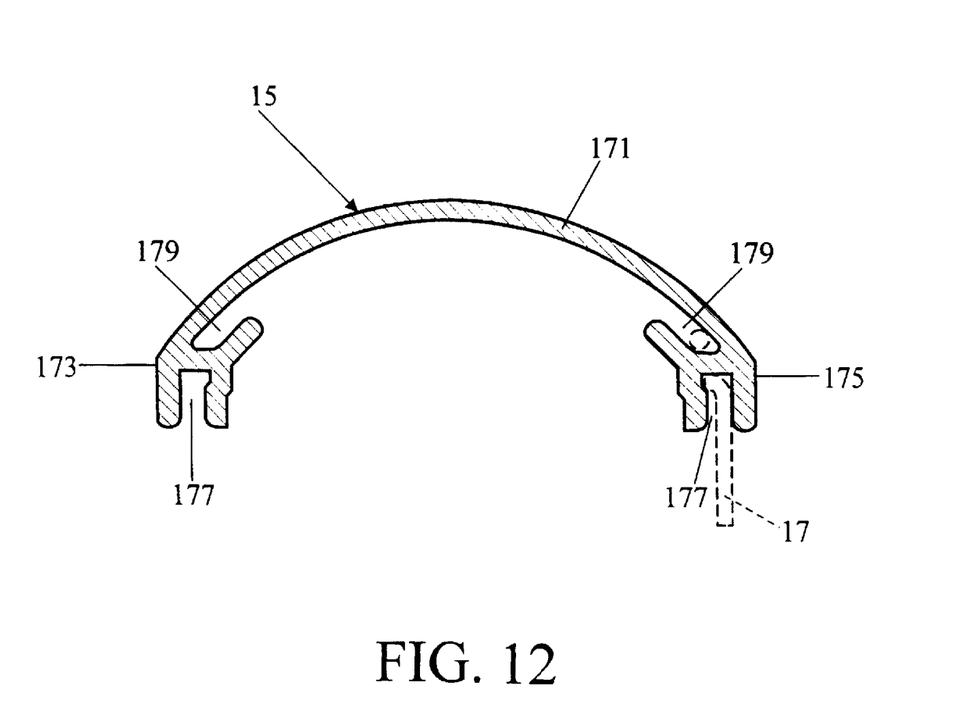
FIG. 12 is a cross section of a mudguard of the cycle.

FIG. 12 shows a cross section of one of the mudguards of the cycle. The mudguard 15 is formed by an extrusion profile 171 that has on its sides 173 and 175 notches 177 and 179 over the entire length for containing dress guards and/or electrical cables (shown with broken lines).

Although above the invention is explained on the basis of the drawings, it should be stated that the invention is in no way limited to the embodiment shown in the drawings. The invention also extends to all embodiments that deviate from the embodiment shown in the drawings within the context defined by the claims.

What is claimed is:

1. A cycle having a front and a rear and comprising: (a) a frame with a seat tube having an axial seat tube portion that leans toward the rear at an angle in the range of 0° to 45° with respect to a vertical direction, (b) a height-adjustable seat connected to and slideable along the seat tube portion, and thereby arranged in a position in front of the seat tube, (c) a rear wheel connected to the frame, (d) a front fork having a front wheel and having a pivoting connection with the frame, (e) a handlebar with a steering tube with one end fastened to the front fork and handgrips that are part of the handlebar and are fastened to the steering tube.

2. Cycle according to claim 1, wherein the cycle comprises a bottom bracket axle that is connected to the frame at a position that is lower than an imaginary line which extends parallel to, and is 10 cm above, an imaginary line that extends through wheel axles of the front and rear wheels, respectively.

3. Cycle according to claim 2, wherein the position of the bottom bracket axle is lower than the imaginary line that extends through the wheel axles of the front and rear wheels.

4. Cycle according to claim 1, wherein the cycle also comprises a back support that is connected to the seat, the back support comprising two parts that are adjustable, one with respect to the other.

5. Cycle according to claim 1, wherein the cycle also comprises a back support, and wherein at least one of the seat and the back support are connected to a profile member that is slideable along the seat tube and is fastenable to the seat tube.

6. Cycle according to claim 5, wherein a bracket is arranged on each side of the seat tube that extends lengthwise from the seat tube, with the profile member sliding between the brackets and the seat tube, and wherein the brackets clamp the profile member securely against the seat tube.

7. Cycle according to claim 1, wherein a rear wheel suspension assembly is disposed on the frame, and comprises a wheel bearer, having a bottom and a top end, and first and second wheel guide arms, each having two ends, an axle of the rear wheel being coupled to the wheel bearer, a first end of the first wheel guide arm being pivotally connected to the bottom end of the wheel bearer, and a second end of the first wheel guide arm being pivotally connected about an imaginary axis through a bottom bracket axle of the cycle to the frame, and a first end of the second wheel guide arm being pivotally connected to the top end of the wheel bearer, and a second end of the second wheel guide arm being pivotally connected to the frame.

8. Cycle according to claim 7, wherein a rear wheel suspension assembly is disposed on each side of the frame, with each of the wheel bearers having a notch for containing an axle of the rear wheel, which notches each comprise a mainly vertically running slot having a bottom end and a top end, said notches being open at said bottom ends thereof and wherein at least one of the notches is provided with a mainly horizontally running further slot that connects to the top end of the vertical slot.

9. Cycle according to claim 1, wherein the handlebar comprises two mainly parallel steering tubes, each with a free end with a handgrip and coupled to each other by a synchronisation mechanism that converts an angular rotation of one of the steering tubes into an equal sized but opposite angular rotation of the other steering tube.

10. Cycle according to claim 9, wherein the synchronisation mechanism comprises at least one coupling element that is connected with both steering tubes, wherein the connection with one of the steering tubes, in terms of the lengthwise direction of the cycle, is on the front of the steering tube and wherein the connection with the other steering tube is present on the rear of that steering tube.

11. Cycle according to claim 10, wherein the synchronisation mechanism comprises two coupling elements, each of which is at least partially formed by a cable, and which cross each other between the steering tubes.

12. Cycle according to claim 1, wherein the cycle comprises a mudguard that is formed by an extrusion profile that on its sides is provided with notches over its entire length for containing at least one of dress guards and electricity cables.

13. Cycle according to claim 1, wherein the cycle comprises a steering head having a housing fastened to the frame and an axle that pivots in the housing that is fastened to a front fork of the cycle, such that the handlebar with the front fork and the front wheel of the cycle can be turned, with the axle being at an angle in relation to the front fork in such a way that an intersection of an imaginary line through the axle and ground is closer to a contact surface of the front wheel with the ground than an intersection of an imaginary line through the front fork with the ground.

14. Cycle according to claim 1, wherein the cycle comprises a kickstand that can pivot between a folded-in position and a folded-out position and wherein the cycle comprises a locking mechanism for blocking the kickstand in the folded-out position, which locking mechanism is housed in a tube of the frame.

15. Cycle according to claim 14, wherein the locking mechanism comprises a revolving cam that can pivot between a release position and a lock position, in which latter position the cam encloses a pin disposed on the kickstand, such that in using a lock either on the cycle or externally the cam can be locked in place.

16. Cycle according to claim 15, wherein the cam can pivot around an axle that is secured by a pin that is fixed in place with a bolt, which bolt is located between parts of the cycle such that the bolt is only accessible to be removed after the cycle has been dismantled.

17. Cycle according to claim 1, wherein the cycle comprises a bottom bracket axle connected to the frame which supports a pair of pedals, and wherein said portion of the seat tube along which the seat is slidable extends up from a position just above the highest possible position of the pedals.

* * * * *